United States Patent [19]

Labbé

[11] Patent Number: 4,609,364
[45] Date of Patent: Sep. 2, 1986

[54] UNIVERSAL COUPLING BETWEEN A FIRST ROTARY SHAFT AND A SECOND ROTARY SHAFT

[76] Inventor: Roland Labbé, 32, allée des Passereaux, 44470 Sainte Luce sur Loire, France

[21] Appl. No.: 744,097
[22] PCT Filed: Sep. 28, 1984
[86] PCT No.: PCT/FR84/00214
§ 371 Date: Jun. 4, 1985
§ 102(e) Date: Jun. 4, 1985
[87] PCT Pub. No.: WO85/01555
PCT Pub. Date: Apr. 11, 1985

[30] Foreign Application Priority Data
Oct. 4, 1983 [FR] France .................. 83 15951

[51] Int. Cl.⁴ .................. F16D 3/16; F16D 3/50
[52] U.S. Cl. .................. 464/112; 464/106; 464/147
[58] Field of Search .............. 403/57, 74; 464/106, 464/111, 112, 120, 122, 123, 124, 147, 149, 151, 904, 905

[56] References Cited
U.S. PATENT DOCUMENTS

| | | | |
|---|---|---|---|
| 1,184,915 | 5/1916 | Bartlett | 464/106 |
| 2,057,736 | 10/1936 | Parville | 464/151 |
| 2,342,625 | 2/1944 | Brooks | |
| 2,354,961 | 8/1944 | O'Donnell | 464/120 X |
| 2,453,279 | 11/1948 | Starbuck | 464/123 X |

FOREIGN PATENT DOCUMENTS

| | | |
|---|---|---|
| 402261 | 4/1934 | Belgium . |
| 2264450 | 11/1973 | Fed. Rep. of Germany . |
| 2355764 | 5/1975 | Fed. Rep. of Germany ...... 464/111 |
| 993818 | 11/1951 | France . |
| 1339994 | 9/1963 | France . |
| 1372843 | 8/1964 | France . |
| 2184701 | 12/1973 | France . |
| 2073369 | 10/1981 | United Kingdom . |
| 2083167A | 3/1982 | United Kingdom . |

Primary Examiner—Stuart S. Levy
Assistant Examiner—Daniel P. Stodola
Attorney, Agent, or Firm—Sughrue, Mion, Zinn, Macpeak & Seas

[57] ABSTRACT

A coupling for simultaneously transmitting identical rotation and motor torque between two shafts which are inclinable to 90°.

It includes a transfer ball (3) constituted by three coaxial meridian disks which oscillate relative to one another, and two tulips (1) and (2) respectively fitted with three drive members (15 to 20) equidistant in threes at the ends of three arms at 120° on each tulip. The drive members engage in pairs on either side of a polar axis in circular toroidal grooves (53) in each of the three meridian disks.

The transfer ball and the tulips are then interdependent and the polar axis is automatically maintained in the plane of the bend between the two shafts and perpendicular to the bisector of the angle closed by their respective half-axes.

13 Claims, 26 Drawing Figures

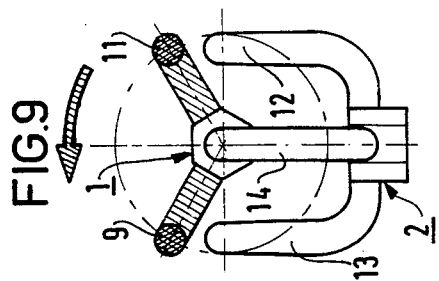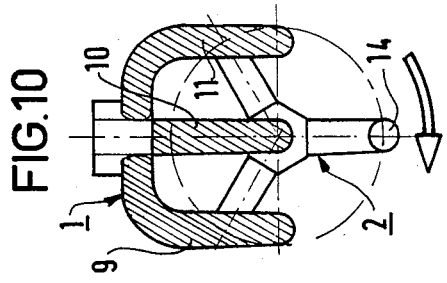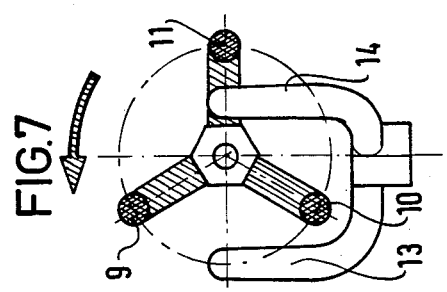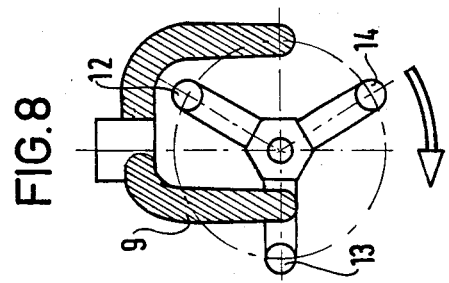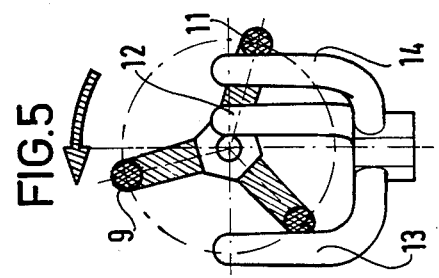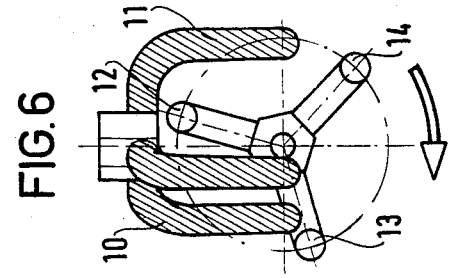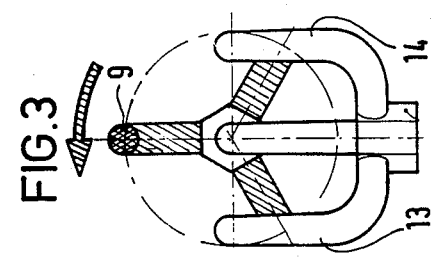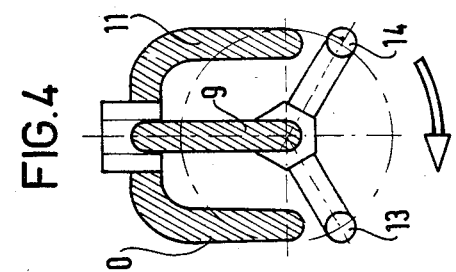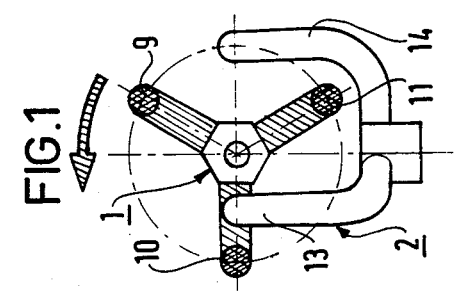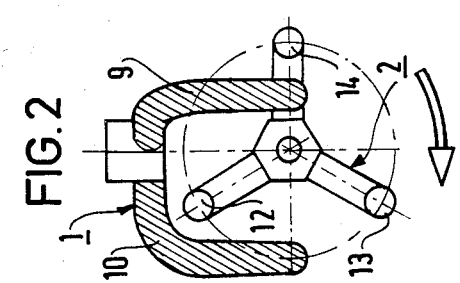

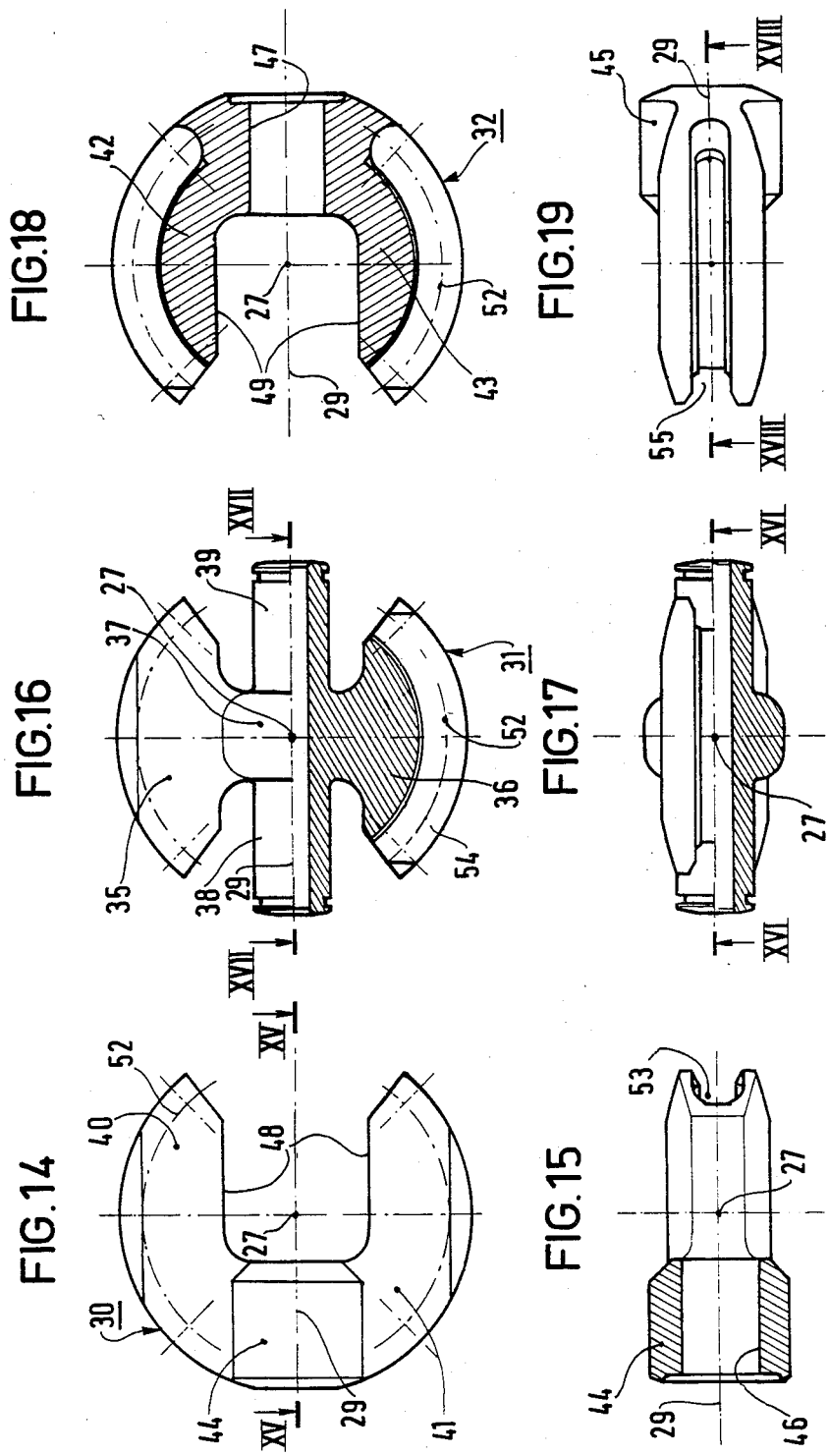

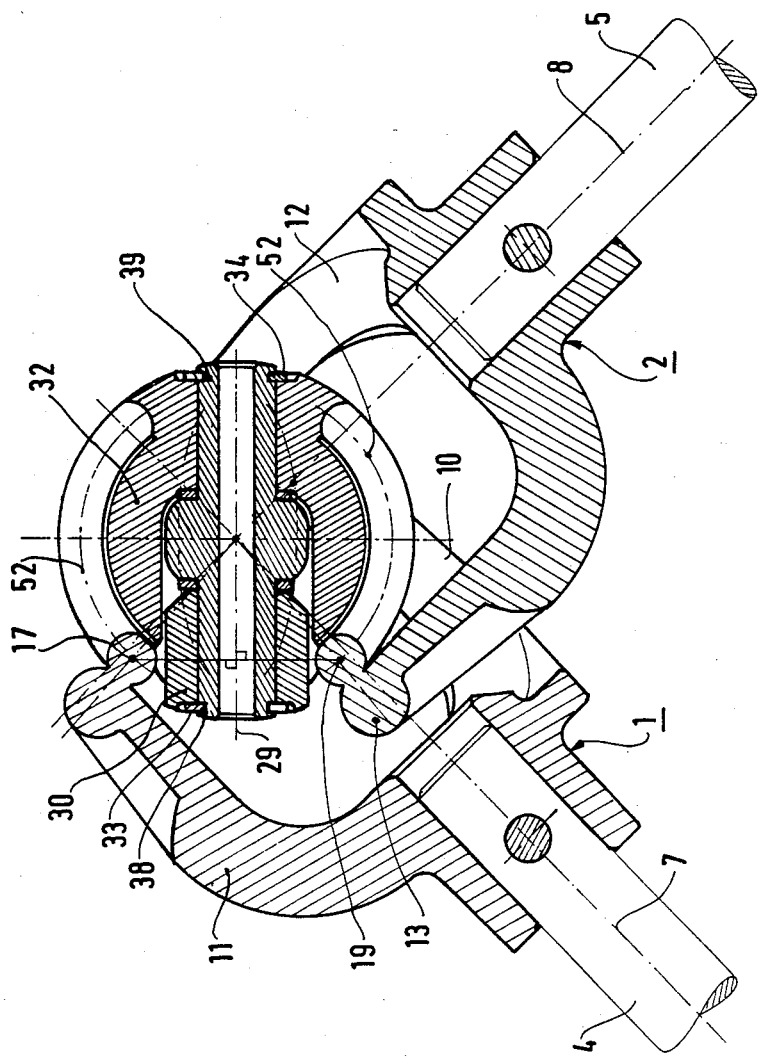

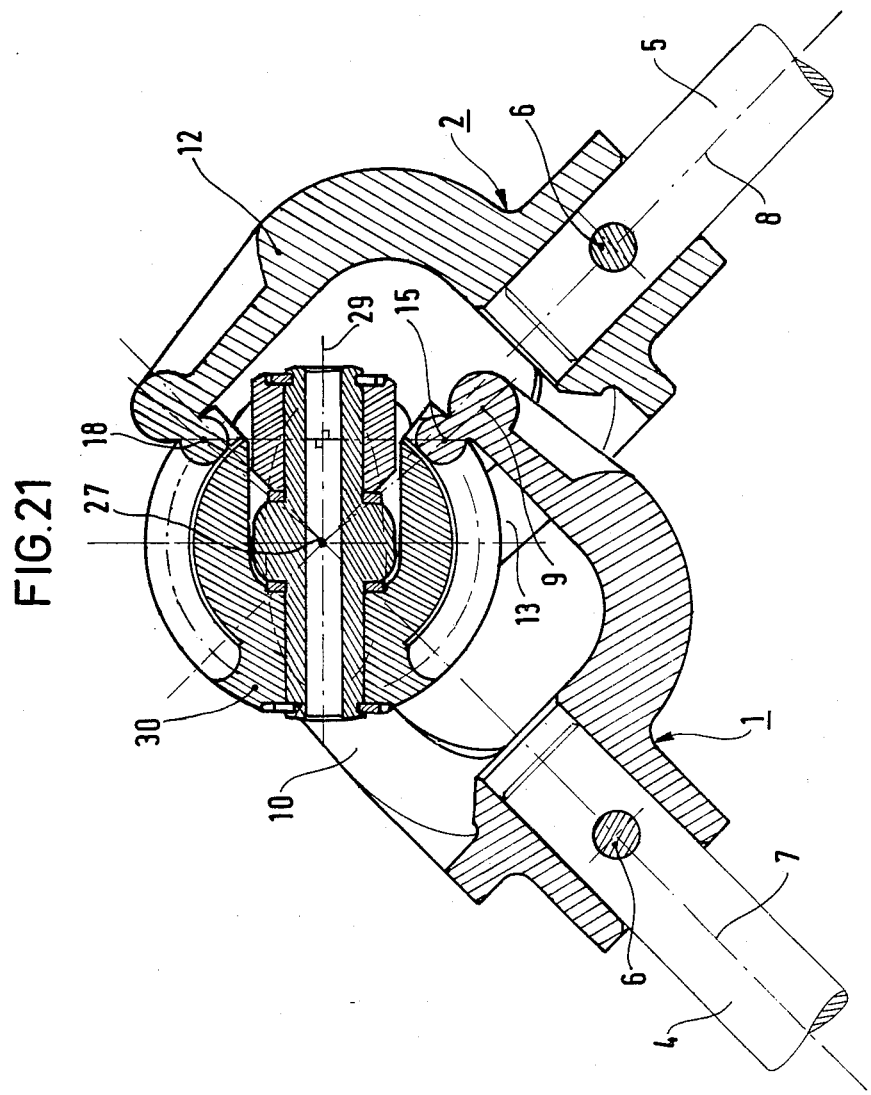

UNIVERSAL COUPLING BETWEEN A FIRST ROTARY SHAFT AND A SECOND ROTARY SHAFT

The present invention relates to a universal coupling between a first rotary shaft and a second rotary shaft, the coupling being of the tripod joint type having a single bending point, and comprising: a transmission unit constituted by an assembly of three oscillating members hinged about a common axis; a first drive tulip fixed to the end of the first shaft; and a second drive tulip fixed to the end of the second shaft; each drive tulip being fitted with three drive members each having an axis of symmetry which is fixed relative to its drive tulip, the axes of symmetry of the six drive members meeting on the said common axis of the three oscillating members, the axes of symmetry of the drive members of the first tulip making an angle $\beta$ with the axis of the first shaft, and the axes of symmetry of the drive members of the second tulip making an angle $\alpha$ with the axis of the second shaft, the projections of the said axes of symmetry of the drive members of each tulip on a plane perpendicular to the axis of the shaft connected to that tulip forming the vertices of a substantially equilateral triangle; each of the three oscillating members including guide means co-operating with a pair of drive members, one of which belongs to the first tulip and the other of which belongs to the second tulip, in such a manner as firstly to prevent a tulip from becoming detached from the said transmission unit, and secondly to enable each drive member to move relative to the oscillating member with which it is co-operating over a portion of a circular path whose middle plane contains the said common axis and the said axis of symmetry of the said drive member under consideration and whose center is located at the said point at which the drive member axes of symmetry meet.

The term "universal joint of the type having a single bending point" is used in distinction, for example, to a coupling having two cardan type joints which imposes two bending points which are more or less close to the line of the shaft connected thereby.

French Pat. No. 2 184 701 describes, with reference to FIGS. 5 and 6, universal coupling having a single bending point as defined above. In this document, the transmission unit is constituted by a hinged assembly of three semicircular plates.

The edge of each plate includes a groove for guiding the said drive members. This groove is of trapezoidal cross section with its larger base closer to the hinge. Each of the two drive tulips is constituted by a spherical cap carrying its three drive members, each of which is constituted by a conical roller whose axis is at an acute angle $\alpha$ with the axis of the shaft carrying the tulip in question. The angle of inclination of the axes of the conical rollers is the same for both tulips, thus giving $\alpha = \beta$. When the shafts are aligned, the three semicircular plates are at 120° intervals from one another. Each semicircular plate thus receives two conical rollers, one from one tulip and the other from the other tulip.

It will readily be understood that such a coupling is quite incapable of bending so that the two shafts are at an angle of 90° to each other. Each roller could have a theoretical stroke of 90° only if it had zero diameter, which is impossible. In practice the shafts cannot be at an angle of less than about 120° to 130° in order to leave room for the rollers to have sufficient diameter, which rollers are obviously incapable of passing through the hinge axis of the three plates.

Further, such a coupling is in mechanical equilibrium only when the three plates are at 120° to one another, which is only true when the shafts are aligned. This makes such a coupling unuseable at high speeds of shaft rotation.

The main aim of the present invention is to provide a universal coupling enabling a very large angular bend between the shafts to be coupled, with the angle between the shafts being capable of going down to 90° or even a little less.

Further, a coupling in accordance with the invention is in mechanical equilibrium at any angle of inclination between the shafts.

Other secondary characteristics enable it to operate at very high speeds of shaft rotation.

According to the invention, a universal coupling as defined above is characterized in that, for each of said oscillating members, the said guide means over a portion of a circular path of the drive members exist, at least to a certain extent, on either side of the common hinge axis, in that each pair of drive members co-operating with the corresponding oscillating member is situated in such a manner that the two drive members of the pair are situated on either side of the said common hinge axis, in that each tulip includes three drive arms enabling the two tulips to interpenetrate without interference during rotation of the shafts even when the axes of the shafts are at an angle, said drive members being placed close to the end of each arm, and in that the said angles $\alpha$ and $\beta$ are supplementary angles.

In a first embodiment the angles $\alpha$ and $\beta$ are different.

Advantageously, the absolute value of half the difference between the angles $\alpha$ and $\beta$ is called $\gamma$, with $\gamma$ being small, i.e. a few degrees. The purpose of having $\alpha$ different from $\beta$ is to ensure that the drive unit cannot move when the shafts are in the aligned position.

In another embodiment, $\alpha = \beta = 90°$, in which case means are provided (if there is any chance of the shafts becoming aligned) to ensure that when the shafts are in the aligned position, the common hinge axis is kept in alignment with the shafts.

In one embodiment, these means comprise, for at least two drive members which are not associated with the same oscillating unit, a system having retractable balls inserted in bores in the said oscillating members, the said balls rolling over the said guide means of the oscillating members under consideration in the said middle planes of the said paths, which include recesses where they intersect the plane perpendicular to the said common hinge axis passing through the said meeting point.

In a first embodiment, the said drive members are constituted by spherical pegs and the said guide means for guiding the said members include a peripheral circular groove in each oscillating member, the groove being of non-closed circular section, with an opening of less than 180°.

Advantageously, each spherical peg is mounted at the end of one of said arms is such a manner as to be able to pivot about the said axis of symmetry.

In another embodiment, which is particularly applicable to shafts rotating at high speed, the said guide means for each oscillating member are constituted by a peripheral circular collar having a cross section in the form of an isosceles trapezium with its small base furthest away from the said common hinge axis, and each drive member includes a carriage having four conical wheels clamping the collar in pairs, the axes of the two wheels situated on the same side of the collar converging on an axis passing through the said meeting point of the axes of symmetry and perpendicular to the said common axis and to the axis of symmetry of the drive member under consideration, the said carriage being mounted, at the end of one of said arms, in such a manner as to be able to pivot about the said axis of symmetry.

Advantageously, the average diameter of the paths of the drive members is the same for all three oscillating members.

According to another characteristic of the invention, in order to relieve the coupling from possible axial loads, the coupling further includes a hinge system with two fork bearings each of which is coaxial with and contains one of the tulips in such a manner that the hinge axis of the said system passes through the meeting point of the axes of symmetry of the said drive members, each of the said fork bearing including a hub which is axially held captive between a stop and a shoulder fixed to the corresponding tulip, the said coupling being free to rotate inside the said system of fork bearings.

Advantageously, the said hinge system with two fork bearings includes locking means for locking the respective angular positions of the axes of their hubs.

There follows a description of an embodiment of the invention with reference to the accompanying drawings. However, before listing the figures and beginning the description, it is specified that in the following description for reasons of convenience, the transmission unit is referred to as a "transfer ball" or a "ball", and each oscillating member of the ball is referred to as a "meridian disk". Likewise, the common hinge axis is referred to as the "polar axis".

Further, in the particular example described below, the average diameter of the paths of the drive members is the same for all three meridian disks, which means that all three disks have the same diameter. This is clearly the most practical case, but it is not essential.

Further, the projections of the axes of symmetry of the drive members of each tulip on a plane perpendicular to the axis of the shaft connected to the said tulip is exactly in the shape of an equilateral triangle, which is likewise the most advantageous case, although small departures therefrom are possible. This, taken in combination with the fact that the meridian disks are of the same diameter, means that for each tulip, the three drive arms are at 120° to one another, since the three drive members are in a plane perpendicular to the axis of the shaft and that in this plane they form the vertices of an equilateral triangle.

Thus, the following description is limited to a particular case which is particularly advantageous.

FIGS. 1 to 10 taken in pairs, respectively 1 and 2, 3 and 4, 5 and 6, 7 and 8, and 9 and 10, are descriptive diagrams in orthogonal projections of two drive tulips of a coupling in accordance with the invention without the ball, and in successive positions of shafts rotation, the shafts being considered as having their axes at an inclination of 90°.

FIGS. 14 to 19 show the three meridian disks of the ball separately.

FIG. 14 shows the first meridian disk.

FIG. 15 is a section on a line XV—XV in FIG. 14.

FIG. 16 shows the second meridian disk in half section on a line XVI—XVI of FIG. 17.

FIG. 17 is a half-section on XVII—XVII of FIG. 16.

FIG. 18 shows the third meridian disk in section on line XVIII—XVIII of FIG. 19.

FIG. 19 is a plan view of the FIG. 18 third meridian disk.

FIGS. 20 and 21 are respective axial sections with the shafts of a coupling in accordance with the invention at 90° to each other, and at two angular positions separated by 60° of rotation; FIG. 20 is a view looking at FIG. 13 along arrow F, and FIG. 21 is derived from FIG. 20 by a rotation of 60° anticlockwise as seen looking at FIG. 13.

Figure 24:
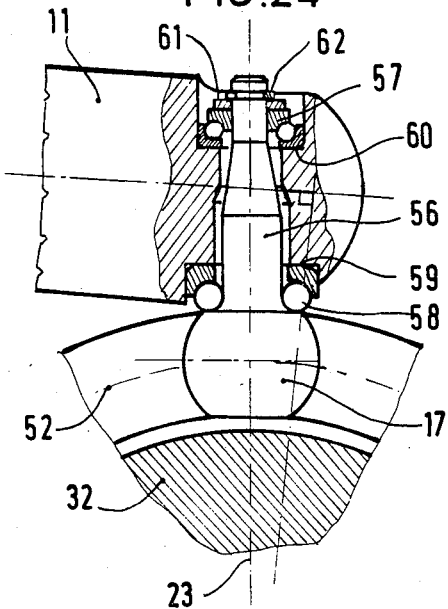

FIG. 24 also shows a detail showing a particular embodiment of a drive member.

Figure 25:
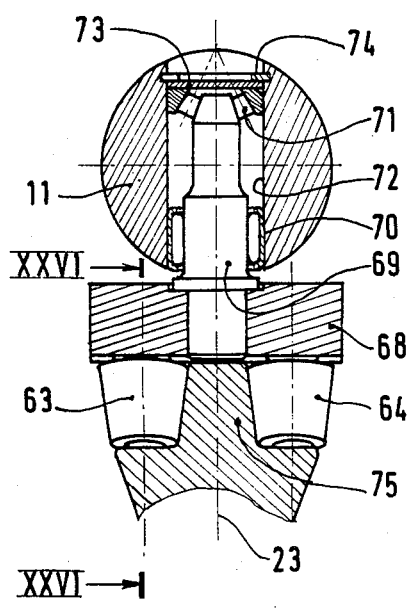
Figure 26:
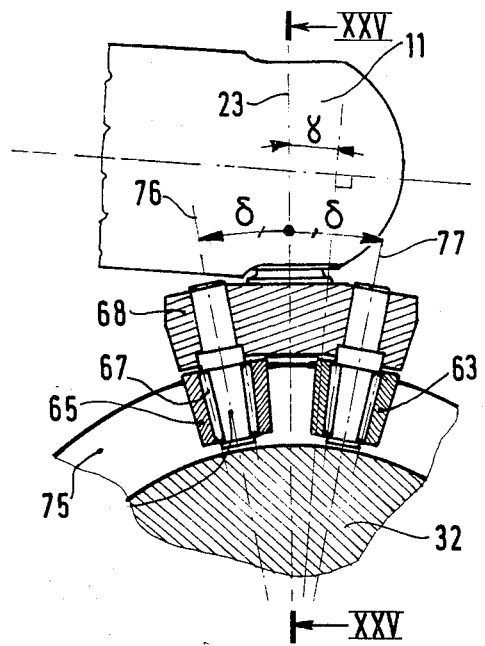

FIGS. 25 and 26 are also views of a portion of another particular embodiment of a drive member.

FIG. 25 is a section on a line XXV—XXV of FIG. 26 with the shafts in alignment.

FIG. 26 is a section on a line XXVI—XXVI of FIG. 25.

Figure 11:
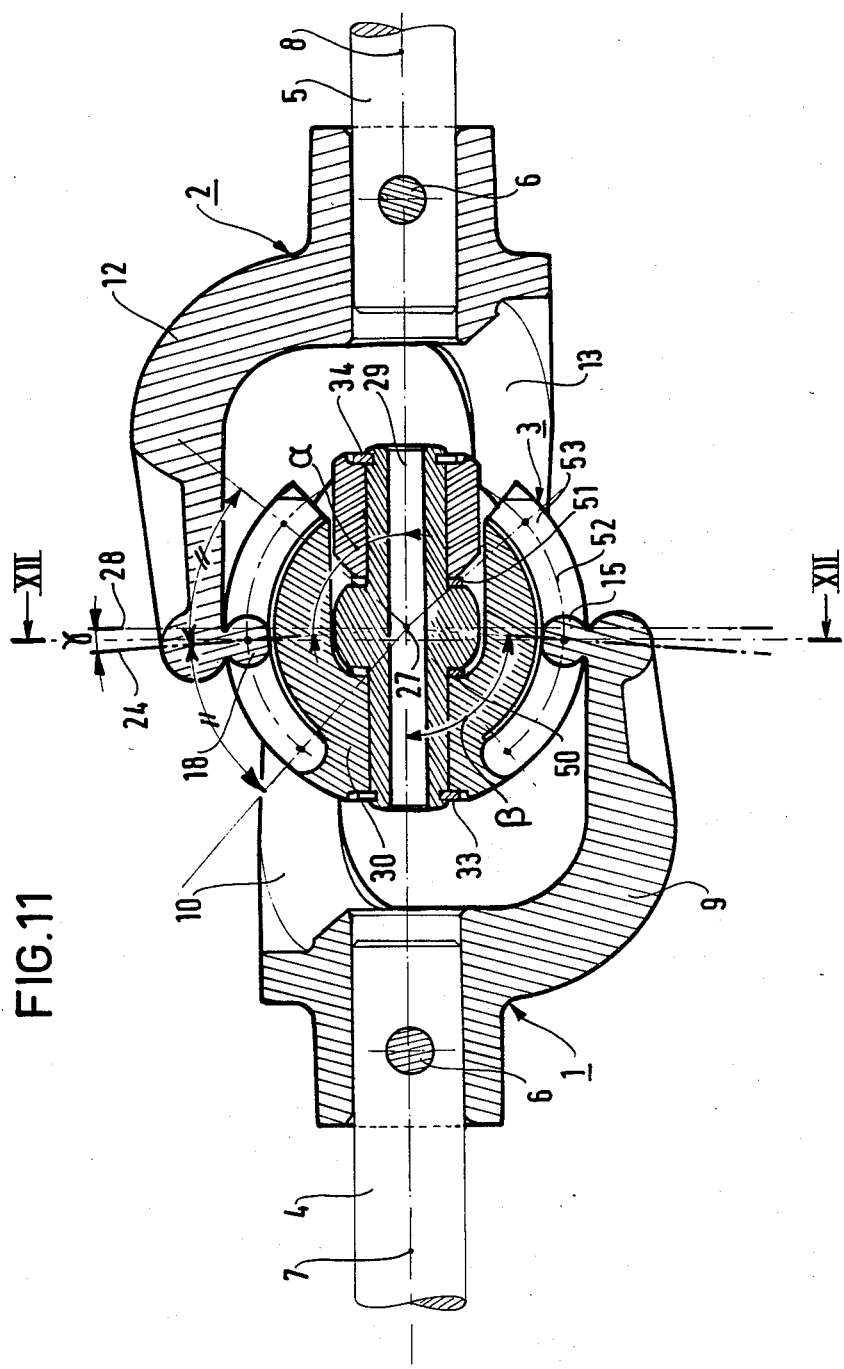
FIG. 11 is an axial section on a line XI—XI of FIG. 12 through a coupling in accordance with the invention and with the shafts aligned.
Figure 12:
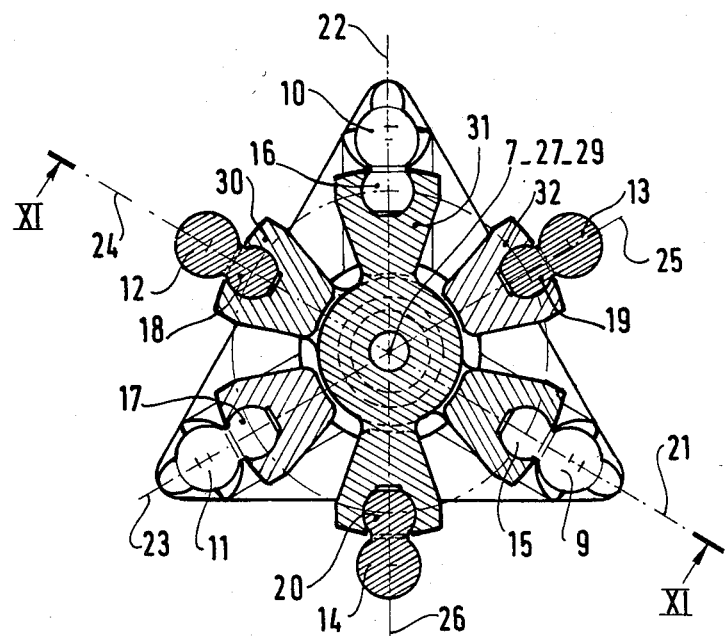
FIG. 12 is a cross section on a line XII—XII of FIG. 11.

With reference to FIGS. 11 and 12, a universal coupling in accordance with the invention essentially comprises three parts: a first drive tulip 1, a second tulip 2, and a transfer ball 3. The shafts to be coupled are referenced 4 and 5. The shaft 4 is connected to the first tulip 1, and the shaft 5 is connected to the second tulip 2. Pins 6 ensure said connection.

In FIGS. 11 and 12, the axes 7 and 8 of the shafts 4 and 5 are aligned.

Each drive tulip includes three drive arms 9, 10 and 11 for the first tulip 1; and 12, 13 and 14 for the second tulip 2. See FIGS. 11, 12, 20, 21 and 22. The arms are respectively at 120° to one another. Each drive arm has a drive member at its end: 15, 16 or 17 for the tulip 1, and 18, 19 or 20 for the second tulip 2.

The drive members have respective axes of symmetry 21 to 26 which all meet at the center 27 of the ball 3. The axes of symmetry 21, 22, and 23 of the drive members 15, 16, and 17 of the first tulip 1 are each at an angle $\beta$ to the axis 7 of the first shaft 4, and the axes of symmetry 24, 25, and 26 of the drive members 18, 19, and 20 of the second tulip 2 are each at an angle $\alpha$ with the axis 8 of the shaft 5 connected to the second tulip 2. The angles $\alpha$ and $\beta$ are supplementary. In the example described $\alpha$ is different from $\beta$. Half the difference between the angles $\alpha$ and $\beta$ is marked $\gamma$ in FIG. 11, and it corresponds the angle by which the axes of symmetry 24, 25 and 26 extend beyond the plane 28 perpendicular to the axes 7 and 8 of the shafts when in the aligned position and passing through the center 27 of the ball whose polar axis 29 is likewise aligned with the axes 7 and 8.

If $\alpha$ is equal to $\beta$, then $\gamma$ is zero, in which case means must be provided, if there is any chance of the shafts passing through the aligned position, to prevent the ball from pivoting while in the aligned position, since if it does, the shafts can no longer move out of alignment. One such means is shown in FIG. 23 and is described below.

However, in the example described, such means are not necessary since $\alpha$ is different from $\beta$, and as a result the ball is in a well-defined and unmodifiable position when the shafts are in the aligned position.

Naturally, the fact that the angle $\gamma$ is not zero means that the tulips 1 and 2 are not completely identical. As can readily been seen in FIGS. 11 and 12, the arms 12, 13 and 14 of the second tulip 2 are slightly longer than the arms 9, 10, and 11 of the first tulip 1.

Figure 23:
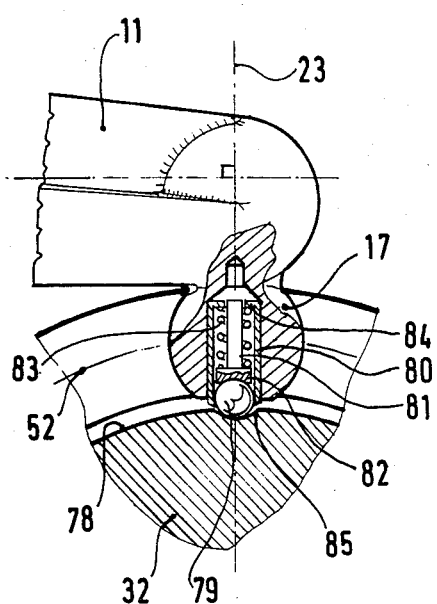
FIG. 23 is a section on a middle peripheral plane through a portion of a meridian disk, showing a drive member comprising a means for retaining the polar axis of the transfer ball when the shafts are in alignment.

Naturally, if perfectly identical tulips are required, it suffices to put $\gamma = 0$ and to use the device shown in FIG. 23 if there is any chance of the line of shafts passing at some moment or another through exact alignment.

The ball 3 is composed of an assembly of three meridian disks 30, 31, 32 oscillating about their common assembly or polar axis 29. The three disks have a common center 27 which is the center of the ball. In order to prevent the disks from moving apart axially from one another, and to keep them in place about a common center, they are held in place by spring clips 33 and 34.

Each of the meridian disks is shown in detail in FIGS. 14 to 19.

FIGS. 14 and 15 show the disk 30, FIGS. 16 and 17 show the disk 31 and FIGS. 18 and 19 show the disk 32.

The central meridian disk 31 is symmetrical about the center 27 of the ball.

It comprises two circular sectors 35 and 36 respectively situated on either side of the polar axis 29 and mounted on a central hub 37 which extends in the form of stub axles 38 and 39 on either side.

The disks 30 and 32 are identical to each other and are generally crescent-shaped in the form of two circular sectors 40 and 41 for the disk 30, and 42 and 43 for the disk 32, which sectors are interconnected by respective off-center hubs 44 and 45. The disks have an axis of symmetry 29 which is the polar or hinge axis of the ball.

These disks are mounted on respective ones of the stub axles 38 and 39 of the central meridian disk by means of respective holes 46 and 47 through their hubs. In the assembled position, the disk 30 has its central notch 48 embracing the hub 37 of the central meridian disk 31 and at least a portion of the hub 45 of the meridian disk 32. Likewise, the disk 32 has its central notch 49 embracing the central hub 37 of the meridian disk 31 and at least a part of the hub 44 of the meridian disk 30.

Washers 50 and 51 (see FIG. 11) center all three disks properly and they are held in place axially by the spring clips 33 and 34 as mentioned above.

Once assembled, the three disks can oscillate relative to one another about the polar or hinge axis 29. Finally, each of the disks possesses guide means of guiding and retaining a pair of drive members selected from the above-mentioned drive members 15 to 20.

For each disk, this consists in a circular track having an average line marked 52 situated in the plane containing the polar axis 29. In the example described, this track is constituted by a peripheral groove of circular section, as can be seen in FIG. 12. This groove is marked 53 for the disk 30 (see FIG. 15), 54 for the disk 31 (see FIG. 16) and 55 for the disk 32 (see FIG. 19). The grooves are of circular section to receive the drive members 15 to 20, which in the example described are spherical pegs (see FIGS. 12, 11, 20, 21).

In order to prevent the ball from becoming disengaged from the spherical pegs, the peripheral circular grooves embrace the spherical pegs over more than one half of their circumference. For each disk, the circular peripheral disk having an average middle line 52 extending over a sector of about 110° on each side of the polar axis 29. Given the minimal size of the drive members, and if the shafts are to be bent at 90°, it is necessary to provide for the sector of the said groove to extend over at least 100° on either side of the polar axis.

When the tulips 1 and 2 are mounted on either side of the ball 3, each meridian disk is engaged by two spherical pegs, one belonging to the tulip 1 and the other to the tulip 2, and in addition, one of the pegs is situated in the peripheral circular groove on one side of the polar axis 29 and the other peg in the peripheral circular groove on the other side of the polar axis.

The pegs, or drive members, 15, 16, and 17 belonging to the tulip 1 engage the disks 30, 31, and 32 respectively, and the pegs 18, 19, and 20 belonging to the tulip 2 engage the disks 30, 31 and 32 respectively.

As has already been mentioned, in the assembled position, the axes of symmetry 21 to 26 of the drive members (spherical pegs) all meet at the central point 27 of the ball 3, and the plane of the middle circular line 52 of the guide means constituted by a groove of circular section is, for each disk, contained in the plane containing the polar axis 29 and the axes of symmetry of the two drive members which co-operate with the disk in question.

Thus, in operation, the drive members are constrained to remain in their respective grooves while moving along the grooves if the axes 4 and 5 of the shafts are not aligned. During this time, and supposing the shafts are not aligned, the disks oscillate relative to one another. Both shafts rotate at exactly the same rate.

The FIG. 20 shows the coupling when the shafts 4 and 5 are in a perpendicular position, and FIG. 21 shows the same coupling after the shafts have both turned through 60° about their respective axes, and anticlockwise as seen from the right of these two figures.

As can be seen in these figures, when the axes 7 and 8 of the shafts are not aligned, the angle between the axis 7 and the polar axis 29 is equal to the angle between the axis 8 and the polar axis 29.

As can readily be seen looking at FIG. 22, which is more fully described below, it is immediately obvious that the middle plane of each drive arm, eg. the arm 11, always remains in the middle plane of the associated meridian disk during rotation of the shafts when they are exactly in alignment; however, this is not at all the case when the shafts are no longer aligned. It is thus necessary for the drive members to be able to pivot relative to their arms, about their axes of symmetry if they cannot pivot in their guide paths. In the example described so far, the drive members are spherical and it is thus not necessary for them to be mounted to pivot about their axes of symmetry.

However, they may be so mounted in order to reduce friction. FIG. 24 thus shows such an an assembly in which the drive member is mounted to be able to pivot about its axis of symmetry. The drive member shown is arbitrarily chosen as number 17 guided and retained by the meridian disk 32. The peg 17 has a shaft-like tail 56 and is mounted at the end of the drive arm 11 by means of bearings 57 and 58 mounted against shoulders 59 and 60. The assembly is held clamped by a shim 61 and a spring clip 62.

FIGS. 25 and 26 show another embodiment of a drive member in which it is necessary, this time, for the drive member assembly to be capable of pivoting about its axis of symmetry.

In this case, the drive member 17 is constituted by four conical rollers 63 to 66, (only three of them, 63, 64 and 65 are visible in the figures) mounted via conical bearings 67 on a carriage 68. The carriage 68 has a shaft 69 mounted to oscillate about the axis of symmetry 23 of the drive member assembly, via a needle bearing 70 and a thrust bearing 71 in a hole 72 through the arm 11. The assembly is held by a shim 73 and a spring clip 74. In this example, meridian disk guide means is no longer constituted by a groove, but rather by a peripheral circular collar 75 of isosceles trapezoidal cross section. The small base of the section is furthest from the polar axis. The conical rollers 63 to 66 obviously have the same slope as the collar 75, and they clamp onto it in pairs 63 and 64, and 65 and 66.

The axes 76 and 77 of the two conical rollers on the same side of the collar converge on an axis passing through the meeting point of the axes of symmetry of the drive members (the center 27 of the ball 27) and perpendicular to the polar axis 29 and to the axis of symmetry 23 of the drive member.

With such a system, it is easy, by means of the shim 73 which may be of chosen thickness, to prestress the conical rollers 63 to 66 against the flanks of the collar 75 and thus avoid the roller vibrating against the flanks of the path.

It can be seen in FIG. 26 that the angle δ between each roller axis 76 or 77 and the axis of symmetry 23 of the pivoting drive member assembly is greater than the angle γ defined above (see FIG. 11).

This is necessary to ensure that the ball is properly retained between the two tulips, and by each of them, such that its center coincides with point at which the axes of symmetry of the three drive members of the tulip 1 meet, and also at the point at which the axes of symmetry of the three drive members of the tulip 2 meet.

The angle γ must thus be as small as possible, and just enough to ensure that the ball is properly held when the shafts are in alignment. A few degrees suffice.

FIG. 23 shows means suitable for holding the ball in place during an operation in which the shafts may at any moment take up an aligned position, and in which γ=0, ie. α=β=90°.

In this case, when the shafts are in the aligned position, the polar axis of the ball is free to point in any direction about its center 27; however, if the polar axis moves out of alignment with the aligned axes of the shafts, the coupling jams and the line of shafts can no longer bend.

FIG. 23 thus shows a drive member 17 which includes a system having a retractable ball inserted in a bore on the axis of symmetry of the drive member facing the bottom of the groove 78 in the meridian disk 32. A ball 79 is housed in a guide cartridge 80 and thrust by a piston 81 including a friction shoe 82 and activated by a spring 83 which bears against the bottom 84 of the cartridge so that the ball is constantly urged against the bottom of the groove 78 in the meridian disk (in the middle plane of the groove). When the shafts are aligned and the coupling is being held in its neutral position against the possibility of the ball freely taking up any position for its polar axis 29, the axis can be fixed by providing a hollow 85 in the bottom of the groove 78 in the plane perpendicular to the polar axis.

Such a system must be provided on at least two drive members which are not associated with the same meridian disk.

FIGS. 1 to 10 show the progress of the arms of the tulips during rotation of the shafts when they are at 90° to each other.

In these figures the arms are referenced.

FIGS. 1 and 2 are the starting point, shown in two orthogonal projections, FIGS. 3 and 4 follow the preceding figures by a rotation through 30°, FIGS. 5 and 6 follow FIGS. 3 and 4 by a rotation through 15°, FIGS. 7 and 8 follow FIGS. 5 and 6 by a rotation through 15°, and FIGS. 9 and 10 follow FIGS. 7 and 8 by a rotation through 30°, giving a total of 90° rotation between FIGS. 1 and 2, and FIGS. 9 and 10.

A further rotation through 30° returns to the FIG. 1 position, but with the references of the arms permutated such that the arm marked 13 becomes 14, and so on. A full turn is thus performed by passing successively three times through the sequence of figures in order, and finally returning to FIGS. 1 and 2.

Figure 13:
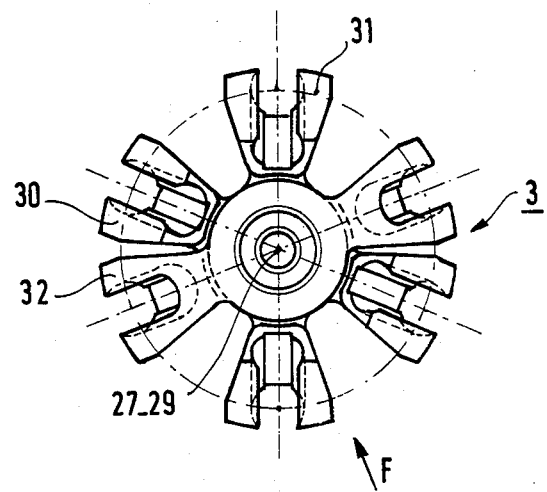
FIG. 13 shows the ball on its own, seen from the same direction as FIG. 12, but with the meridian disks in a relative position corresponding to the axes of the rotary shafts in a perpendicular position and in the rotary position shown in FIGS. 3 and 4 or in FIGS. 9 and 10.

These diagrams serve to check the levels at which the tulips interfere mutually, given the technological requirement of leaving enough room for each arm to withstand the expected forces. It can be seen that the most critical position is that corresponding to FIGS. 5 and 6. In contrast, FIGS. 3 and 4 or 9 and 10 show two symmetrical configurations which are special in that each tulip has one drive arm in the plane of the bend between the shafts thus enabling additional bending of about 20°. This feature may be taken advantage of, for example, when assembling the coupling. In these configurations the ball has its disks respectively placed as shown in FIG. 13, and corresponding to the position of FIGS. 20 and 21 in which the angular offset is 60°.

For example, disassembly may take place as follows, starting from FIG. 20 and after removing the spring clips 33 and 34: the tulips 1 and 2 are inclined as far as possible, ie. until the pegs 17 and 19 bear against the hub 44 of the meridian disk 30. In this position, the meridian disk 32 is easily disengaged and none of the arms of the tulip 2 gets in the way. Once the disk 32 has been removed, the coupling is no longer stable; however, in order to disengage the meridian disk 30 the same procedure must be followed in the configuration of FIG. 21 relative to the drive members 15 and 18 which are engaged in the groove 53 of the disk 30. Once the disk 30 has been removed, there is no further difficulty in disengaging the drive members 16 and 20 from the groove 54 of the disk 31.

To reassemble, the disk 31 is first reassembled on any of the drive members of the tulip 1 and on any of the drive members of the tulip 2; the disassembly steps are then followed in the reverse order.

Figure 22:
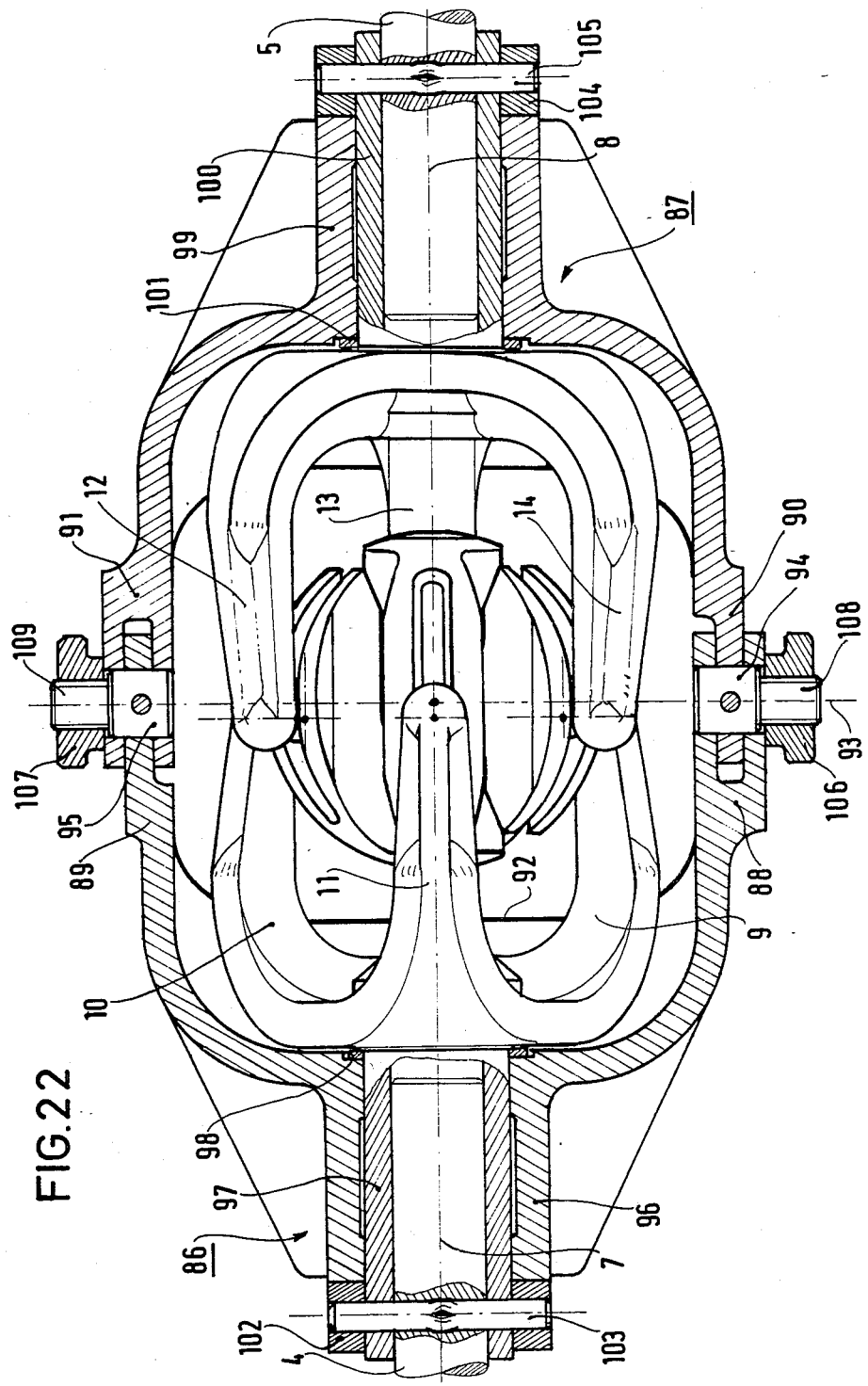
FIG. 22 shows the coupling with the shafts aligned and associated with a hinge system having two fork bearings.

Finally, FIG. 22 shows the coupling associated with a system of hinged fork bearings for relieving the coupling of possible excess axial forces. This system comprises two bearings 86 and 87, with the bearing 86 having two forks 88 and 89 and the bearing 87 having two forks 90 and 91. These bearings partially enclose the coupling. Reference 92 designates the edge of a background envelope for the bearing 86 which envelope is connected to the forks 88 and 89. A similar disposition applies to the bearing 87.

These two bearings are mounted facing each other and they are fixed together along a hinge axis 93 by means of their forks 88 and 90, or 89 and 91, receiving respective pins 94 and 95.

Naturally, the hinge axis 93 passes through the meeting point of the axes of symmetry of the six drive members, ie. through the center 27 of the ball.

The bearing 86 is mounted via its hub 96 on the hub 97 of the first tulip 1. A shim 98 is interposed between respective shoulders on the tulip and the bearing, thus making it possible to adjust the hinge axis 93 of the bearings to pass exactly through the center 27 of the ball 3. Likewise, and for the same reasons, the bearing 87 is mounted via its hub 99 on the hub 100 of the second tulip 2 together with a shim 101 which is interposed between respective shoulders on the tulip and the bearing. The bearing 86 is axially retained by a back stop 102 mounted to abut against the rear of the hub 96 of the bearing 86 and fixed to the hub 97 of the first tulip 1 by a pin 103 passing through the shaft 4.

Likewise, the bearing 87 is axially retained by a back stop 104 mounted to abut against the rear portion of the hub 99 of the bearing 87 and is fixed to the hub 100 of the second tulip 2 by a pin 105 which passes through the shaft 5.

The coupling is then free to rotate in each of the bearings regardless of the bend between the shafts, and axial forces between one transmission shaft and the other thus pass through the fork bearings.

Two knurled knobs 106 and 107 permanently fixed on threaded ends 108, 109 of the pins 94 and 95 serve to lock the fork bearings at a given inclination of the shafts.

Just as the drive members may be made and mounted as described above with reference to FIGS. 24 and 26 in order to reduce all relative movements to friction-free rotation, it is likewise possible, and for the same reasons, to provide the meridian disks 30 and 32 with radial and axial ball bearings on the stub axles 38 and 39 of the central meridian disk 31. The coupling is then highly efficient and capable of turning at high speed.

I claim:

1. A universal coupling between a first rotary shaft (7) and a second rotary shaft (8), the coupling being of the tripod joint type having a single bending point (27), and comprising:
   a transmission unit (3) constituted by an assembly of three oscillating members (30, 31, 32) hinged about a common axis (29);
   a first drive tulip (1) fixed to the end of the first shaft; and
   a second drive tulip (2) fixed to the end of the second shaft;
   each drive tulip being fitted with three drive members (15 to 20) each having an axis of symmetry (21 to 26) which is fixed relative to its drive tulip, the axes of symmetry of the six drive members meeting on the said common axis (29) of the three oscillating members, the axes of symmetry (21 to 23) of the drive members of the first tulip making an angle $\beta$ with the axis (7) of the first shaft, and the axes of symmetry (24 to 26) of the drive members of the second tulip making an angle $\alpha$ with the axis (8) of the second shaft, the projections of the said axes of symmetry of the drive members of each tulip on a plane perpendicular to the axis of the shaft connected to that tulip forming the vertices of a substantially equilateral triangle, each of the three oscillating members including guide means (53, 54, 55, 75) co-operating with a pair of drive members, one of which belongs to the first tulip and the other of which belongs to the second tulip, in such a manner as firstly to prevent a tulip from becoming detached from the said transmission unit, and secondly to enable each drive member to move relative to the oscillating member with which it is co-operating over a portion of a circular path whose median plane contains the said common axis and the said axis of symmetry of the said drive member under consideration and whose center (27) is located at the said point at which the drive member axes of symmetry meet;
   the coupling being characterized in that, for each of said oscillating members, the said guide means over a portion of a circular path of the drive members exist, at least to a certain extent, on each side of the common hinge axis (29),
   in that each pair of drive members co-operating with the corresponding oscillating member is situated in such a manner that the two drive members of the pair are situated on each side of the said common hinge axis,
   in that each tulip includes three drive arms (9 to 14) enabling the two tulips to interpenetrate without interference during rotation of the shafts even when the axes of the shafts are at an angle, said drive members being placed close to the end of each arm, and
   in that the said angles $\alpha$ and $\beta$ are supplementary angles.

2. A coupling according to claim 1, characterized in that the angle $\alpha$ = the angle $\beta$ = 90°.

3. A coupling according to claim 1, characterized in that the angles $\alpha$ and $\beta$ are different.

4. A coupling according to claim 3, characterized in that the absolute value of half the difference between the angles $\alpha$ and $\beta$ is $\gamma$, with $\gamma$ being a few degrees.

5. A coupling according to claim 2 or 3, wherein the said extent of the guide means for each oscillating member is at least 100°.

6. A coupling according to claim 2 or 3, characterized in that the said drive members are constituted by spherical pegs (15 to 20) and in that the said guide means of the said members include a peripheral circular groove (53 to 55) for each oscillating member, the groove being of non-closed circular section, with an opening of less than 180°.

7. A coupling according to claim 6, characterized in that each spherical peg is mounted at the end of one of said arms in such a manner as to be able to pivot about the said axis of symmetry.

8. A coupling according to claim 2 or 3, characterized in that the said guide means for each oscillating member are constituted by a peripheral circular peripheral collar (75) having a cross section in the form of an isosceles trapezium with its small base furthest away from the said common hinge axis, and in that each drive member includes a carriage (68) having four conical wheels (63 to 66) clamping the collar in pairs, the axes (76, 77) of the two wheels (63, 65) situated on the same side of the collar converging on an axis passing through the said meeting point (27) of the axes of symmetry and perpendicular to the said common axis (29) and to the axis of symmetry of the drive member under consideration, the carriage being mounted, at the end of one of said arms, in such a manner as to be able to pivot about the said axis of symmetry.

9. A coupling according to claim 2, characterized in that means are provided such that when the shafts are in alignment, the common hinge axis is kept in alignment with the said shafts.

10. A coupling according to claim 9, characterized in that the said means include, for at least two drive members not associated with the same oscillating member, a system (80 to 84) having retractable balls (79) inserted in a bore in the said member, the said ball rolling over the said guide means of the oscillating member under consideration in the said median plane of the said path, which includes a recess (85) where they intersect the plane perpendicular to the said common hinge axis passing through the said meeting point.

11. A coupling according to claim 2 or 3, characterized in that the average diameter of the paths of the drive members is the same for all three oscillating members.

12. A coupling according to claim 2 or 3, characterized in that it further includes a hinge system with two fork (88 to 91) bearings (86, 87) each of which is coaxial with and contains one of the tulips in such a manner that the hinge axis (93) of the said system passes through the meeting point (27) of the axes of symmetry of the said drive members, each of the said fork bearing including a hub (96, 99) which is axially held captive between a stop (102, 104) and a shoulder fixed to the corresponding tulip, the said coupling being free to rotate inside the said system of fork bearings.

13. A coupling according to claim 12, characterized in that the said hinge system with two fork bearings includes locking means 106, 107) for locking the respective angular positions of the axes of their hubs.

* * * * *